United States Patent
Reyes et al.

(10) Patent No.: US 9,664,017 B2
(45) Date of Patent: May 30, 2017

(54) METHODS AND SYSTEMS FOR GENERATING REACTIVE FLUORIDE SPECIES FROM A GASEOUS PRECURSOR IN A SUBTERRANEAN FORMATION FOR STIMULATION THEREOF

(71) Applicant: Halliburton Energy Services, Inc., Houston, TX (US)

(72) Inventors: Enrique Antonio Reyes, Tomball, TX (US); Aaron Michael Beuterbaugh, Spring, TX (US); Alyssa Lynn Smith, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 70 days.

(21) Appl. No.: 14/361,031

(22) PCT Filed: Aug. 29, 2013

(86) PCT No.: PCT/US2013/057218
§ 371 (c)(1),
(2) Date: May 28, 2014

(87) PCT Pub. No.: WO2015/030761
PCT Pub. Date: Mar. 5, 2015

(65) Prior Publication Data
US 2015/0315885 A1 Nov. 5, 2015

(51) Int. Cl.
*C09K 13/08* (2006.01)
*E21B 43/16* (2006.01)
(Continued)

(52) U.S. Cl.
CPC ............... *E21B 43/16* (2013.01); *C09K 8/03* (2013.01); *C09K 8/70* (2013.01); *C09K 8/72* (2013.01);
(Continued)

(58) Field of Classification Search
CPC ...... E21B 43/166–43/168; E21B 43/16; E21B 43/295; E21B 43/255; C09K 13/08
(Continued)

(56) References Cited

U.S. PATENT DOCUMENTS 3,615,956 A 10/1971 Irving et al.
4,303,467 A 12/1981 Scornavacca et al.
(Continued)

FOREIGN PATENT DOCUMENTS

WO 2015030761 A1 3/2015

OTHER PUBLICATIONS

Guiliano et al., "Supercritical Fluid Extraction of Bal 150 Crude Oil Asphaltenes," American Chemical Society, Energy & Fuels 2000, 14, 89-94.
(Continued)

*Primary Examiner* — Doug Hutton, Jr.
*Assistant Examiner* — Ashish Varma
(74) *Attorney, Agent, or Firm* — McDermott Will & Emery LLP

(57) ABSTRACT

In situ generation of hydrogen fluoride or other reactive fluoride species can sometimes be beneficial during an acidizing operation, particularly when it is desired to limit the presence of a carrier fluid that may be present. Methods for acidizing a subterranean formation can comprise: providing a treatment fluid comprising a non-HF fluoride compound, the non-HF fluoride compound being a gas at standard temperature and pressure and that is free of boron; introducing the treatment fluid into a subterranean formation; transforming the non-HF fluoride compound into a reactive fluoride species; and etching a surface in the subterranean formation with the reactive fluoride species, the surface comprising a siliceous material.

19 Claims, 1 Drawing Sheet

(51) Int. Cl.

| | | |
|---|---|---|
| *E21B 43/267* | (2006.01) | |
| *C09K 8/03* | (2006.01) | |
| *C09K 8/70* | (2006.01) | |
| *C09K 8/72* | (2006.01) | |
| *C09K 8/92* | (2006.01) | |
| *E21B 43/25* | (2006.01) | |
| *E21B 43/26* | (2006.01) | |

(52) U.S. Cl.
CPC .............. *C09K 8/92* (2013.01); *E21B 43/166* (2013.01); *E21B 43/255* (2013.01); *E21B 43/26* (2013.01); *E21B 43/267* (2013.01)

(58) Field of Classification Search
USPC ........................................................ 166/300
See application file for complete search history.

(56) References Cited

U.S. PATENT DOCUMENTS

| | | | |
|---|---|---|---|
| 4,446,920 A * | 5/1984 | Woytek | E21B 29/02 149/108.2 |
| 4,900,395 A | 2/1990 | Syverson et al. | |
| 4,975,259 A * | 12/1990 | Hyakutake | C01B 21/0837 423/406 |
| 5,268,069 A | 12/1993 | Chapple-Sokol et al. | |
| 5,340,437 A | 8/1994 | Erk et al. | |
| 5,404,951 A | 4/1995 | Lai et al. | |
| 2006/0264333 A1 | 11/2006 | McDaniel et al. | |
| 2006/0278299 A1* | 12/2006 | Jang | F04B 15/08 141/2 |
| 2008/0135242 A1 | 6/2008 | Lesko et al. | |
| 2008/0314594 A1* | 12/2008 | Still | C09K 8/72 166/307 |
| 2010/0276146 A1* | 11/2010 | Smith | E21B 43/16 166/302 |
| 2012/0067576 A1* | 3/2012 | Reyes | C09K 8/74 166/279 |
| 2012/0145401 A1 | 6/2012 | Reyes | |
| 2013/0269941 A1 | 10/2013 | Reyes et al. | |
| 2014/0116696 A1 | 5/2014 | Reyes | |

OTHER PUBLICATIONS

Xiao et al., "Coupled Reactive Transport Models of Acid Gas Injection (AGI) in Siliciclastic and Carbonate Reservoirs: Understanding Fundamental Controls on Injection Performance and Storage Security," International Petroleum Technology Conference, IPTC 13279, 2009.

Mohamed et al., "Sulfate Precipitation During CO2 Sequestration in Carbonate Rock," Society of Petroleum Engineers, SPE 139828, 2011.

Mohamed et al., "Permeability Change During CO2 Injection in Carbonate Aquifers: Experimental Study," Society of Petroleum Engineers, SPE 140979, 2011.

Mohamed et al., "Formation Damage Due to CO2 Sequestration in Deep Saline Carbonate Aquifers," Society of Petroleum Engineers, SPE 151142, 2012.

Chang et al., "Gas-Phase Silicon Micromachining with Xenon Difluoride," SPIE vol. 2641, 117-128, 2007.

Krumhans et al., "Geological Sequestration of Carbon Dioxide in a Depleted Oil Reservoir," Society of Petroleum Engineers, SPE 75256, 2002.

Wellman et al., "Evaluation of CO2-Brine-Reservoir Rock Interaction with Laboratory Flow Tests and Reactive Transport Modeling," Society of Petroleum Engineers, SPE 80228, 2003.

Vileno et al., "Thermal Decomposition of NF3 with Various Oxides," Chem. Mater. 1996, 8, 1217-1221.

Khoo et al., "Environmental Impact Evaluation of Conventional Fossil Fuel Production (Oil and Natural Gas) and Enhanced Resource Recovery with Potential CO2 Sequestration," American Chemical Society, Energy & Fuels 2006, 20, 1914-1924.

Zhang et al., "Injection of Supercritical CO2 into Deep Saline Carbonate Formations: Predictions from Geochemical Modeling," Society of Petroleum Engineers, SPE 121272, 2011.

Golja et al, "A Review of Nitrogen Trifluoride for Dry Etching in Microelectronics Processing," Microelectronics Journal, vol. 16, No. 1, 1985 Benn Electronics Publications Ltd., Luton.

International Search Report and Written Opinion for PCT/US2013/057218 dated May 7, 2014.

* cited by examiner

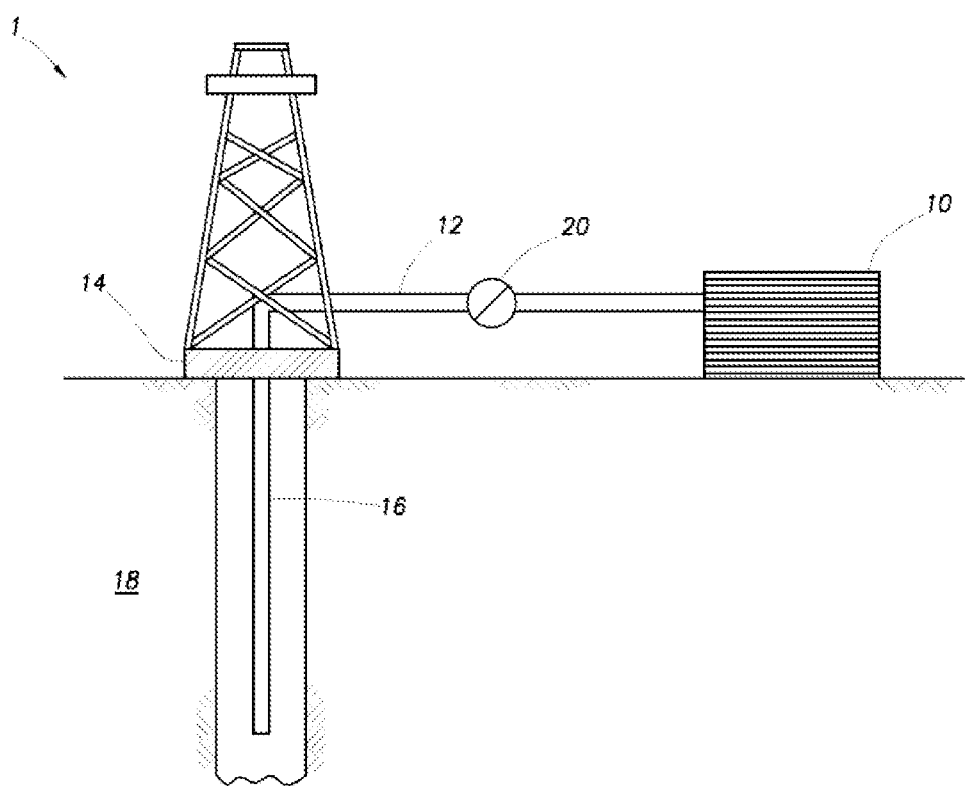

US 9,664,017 B2

METHODS AND SYSTEMS FOR GENERATING REACTIVE FLUORIDE SPECIES FROM A GASEOUS PRECURSOR IN A SUBTERRANEAN FORMATION FOR STIMULATION THEREOF

BACKGROUND

The present disclosure generally relates to methods for stimulating a subterranean formation, and, more specifically, to methods for generating fluoride species that are reactive with a siliceous material.

Treatment fluids can be used in a variety of subterranean treatment operations. Such treatment operations can include, without limitation, drilling operations, stimulation operations, production operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof, unless otherwise specified herein. Illustrative treatment operations can include, for example, drilling operations, fracturing operations, gravel packing operations, acidizing operations, scale dissolution and removal operations, sand control operations, consolidation operations, and the like.

Acidizing operations may be used to stimulate a subterranean formation to increase production of a hydrocarbon resource therefrom. During an acidizing operation, an acid-sensitive solid in the subterranean formation can be interacted with one or more acids to expand existing flow pathways in the subterranean formation, to create new flow pathways in the subterranean formation, and/or to remove precipitation damage in the subterranean formation. The acid-sensitive solid being interacted with the acid(s) can be part of the native formation matrix or can have been deliberately introduced into the subterranean formation in conjunction with a stimulation or like treatment operation (e.g., proppant or gravel particulates). Illustrative substances within the native formation matrix that may interact with an acid during an acidizing operation include, but are not limited to, carbonates, silicates and aluminosilicates. Other substances can also interact with an acid during the course of performing an acidizing operation, and the foregoing substances should not be considered to limit the scope of substances that may undergo acidization.

Carbonate formations can contain minerals that comprise a carbonate anion. Calcite (calcium carbonate) and dolomite (calcium magnesium carbonate) are representative examples. When acidizing a carbonate formation, the acidity of the treatment fluid alone can be sufficient to decompose the carbonate anion to carbon dioxide and leech a metal ion into the treatment fluid. Both mineral acids (e.g., hydrochloric acid) and organic acids (e.g., acetic and formic acids) can be used to treat a carbonate formation, often with similar degrees of success.

Siliceous formations can include minerals such as, for example, zeolites, clays, and feldspars, although various quantities of non-siliceous materials may also be present. As used herein, the term "siliceous" refers to a substance having the characteristics of silica, including silicates and/or aluminosilicates. Most sandstone formations, for example, contain about 40% to about 98% sand quartz particles (i.e., silica), bonded together by various amounts of cementing materials, which may be siliceous in nature (e.g., aluminosilicates or other silicates) or non-siliceous in nature (e.g., carbonates, such as calcite). Acidizing a siliceous formation or a formation containing a siliceous material is thought to be considerably different than acidizing a carbonate formation. Specifically, the mineral and organic acids that can be effective for acidizing a carbonate formation may have little effect on a siliceous formation, since these acids do not effectively react with siliceous materials. In contrast, hydrofluoric acid, another mineral acid, can react very readily with siliceous materials to promote their dissolution through forming a fluorinated silicon compound. Oftentimes, a mineral acid or an organic acid can be used in conjunction with hydrofluoric acid to maintain a low pH state within the treatment fluid as the hydrofluoric acid becomes spent during its reaction with the siliceous material. The low pH state may readily promote ready solubility of silicon or aluminum fluorides in the treatment fluid and aid in maintaining these substances in a dissolved state. The additional acid(s) may also promote dissolution of non-siliceous materials in the subterranean formation as well.

The introduction of hydraulic fracturing, horizontal drilling, and incursion into low permeability formations (e.g., shale formations) has greatly expanded the range of potential acidizing targets. Shale formations are considerably different from conventional hydrocarbon reservoirs. In this regard, they present a range of mineralogical analyses ranging from relative clean quartz (>90%) to mixtures with >20% clay. Carbonate minerals and sandstone may also be present. The other distinguishing feature of shale formations is their extremely low permeability, which may lie within the nanodarcy to microdarcy range. Due to capillary forces induced by the low permeability, fluid recovery from such formations can be a challenge, particularly aqueous fluid recovery. Although surfactants can be used to decrease the capillary forces and promote fluid recovery, their use can add to the cost and complexity of conducting a subterranean treatment operation.

Although treatment fluids containing hydrofluoric acid and, optionally, another acid can desirably affect dissolution of siliceous materials, the use of such low pH fluids can have unwanted consequences in certain instances. Specifically, at low pH values, particularly above about 2, dissolved fluoride ions can sometimes precipitate with aluminum and damage the subterranean formation, particularly in the presence of certain cations such as, for example, Group 1 metal ions (e.g., $Na^+$ and $K^+$) and/or Group 2 metal ions (e.g., $Ca^{2+}$ and $Ba^{2+}$). In some cases, precipitation of this type can damage a subterranean formation and inhibit production more than if the original treatment operation had not been performed at all. In certain cases, the problematic metal ions may be introduced to the subterranean formation through an aqueous carrier fluid in which the hydrofluoric acid and other acid(s) are present. Alkali metal acids such as, for example, $KHF_2$ may also be problematic. In addition, aqueous carrier fluids containing one or more acids can present corrosion, safety, and waste disposal issues. Moreover, sourcing of an appropriate aqueous carrier fluid can also be an issue in certain instances, such as in remote or arid locations where water infrastructure may be limited.

BRIEF DESCRIPTION OF THE DRAWING

The following FIGURE is included to illustrate certain aspects of the present disclosure, and should not be viewed as an exclusive embodiment. The subject matter disclosed is capable of considerable modifications, alterations, combi- FIG. 1 shows an illustrative schematic of a system that can deliver treatment fluids of the present disclosure to a downhole location, according to one or more embodiments.

DETAILED DESCRIPTION

The present disclosure generally relates to methods for stimulating a subterranean formation, and, more specifically, to methods for generating fluoride species that are reactive with a siliceous material.

One or more illustrative embodiments incorporating the disclosure herein are presented below. Not all features of an actual implementation are described or shown in this application for the sake of clarity. It is to be understood that in the development of an actual embodiment incorporating the present disclosure, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for one having ordinary skill in the art and the benefit of this disclosure.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claim, each numerical parameter should at least be construed in light of the number of reported significant digits and by applying ordinary rounding techniques.

As discussed above, current approaches for acidizing a siliceous material in a subterranean formation typically use hydrofluoric acid in an aqueous carrier fluid. Although such acidizing techniques can often be used successfully to stimulate a subterranean formation, they can present several challenges, some of which are discussed in more detail above. Hydrofluoric acid comprises hydrogen fluoride gas dissolved in water, an aqueous carrier fluid. The present inventors recognized that if hydrogen fluoride gas or another reactive fluoride species could readily be used in place of aqueous hydrogen fluoride (i.e., hydrofluoric acid), certain advantages could be realized while acidizing a siliceous material in a subterranean formation. Some of these advantages and the inventors' solution to avoid the direct use of hydrogen fluoride gas are discussed hereinafter.

The use of neat hydrogen fluoride in an acidizing operation can be extremely problematic due to the highly corrosive and toxic nature of this gas. As used herein the term "neat hydrogen fluoride" refers to gaseous HF, or its liquefied form, as opposed to aqueous hydrofluoric acid: $HF + H_2O \leftrightarrows H_3O^+ + F^-$. As a result, the benefits potentially attainable through direct introduction of neat hydrogen fluoride to a subterranean formation may often be outweighed by the difficulties associated with working with this gas. As a solution to these issues, the present inventors recognized that certain compounds could be used to readily generate hydrogen fluoride or other reactive fluoride species within a subterranean formation. Such compounds are referred to herein as "non-HF fluoride compounds," referring to their capacity for being precursors to hydrogen fluoride or other reactive substances that may react with siliceous materials.

Non-HF fluoride compounds suitable for use in the embodiments described herein generally contain at least one fluorine atom and one or more other types of atoms. In some embodiments, the non-HF fluoride compound may decompose in the subterranean formation to form a reactive fluoride species comprising hydrogen fluoride and, optionally, a gaseous co-product. In some embodiments, particularly suitable non-HF fluoride compounds may include, for example, a fluorocarbon, a fluoride hydrocarbon, xenon difluoride ($XeF_2$), nitrogen trifluoride ($NF_3$), or any combination thereof. The foregoing compounds are gases at standard temperature and pressure.

Suitable fluorocarbons and fluoride hydrocarbons (also commonly referred to as hydrofluorocarbons) include, but are not limited to, tetrafluoromethane ($CF_4$, sold under the tradename HALOCARBON 14 by Advanced Specialty Gases of Reno, Nev.), trifluoromethane ($CHF_3$, sold under the tradename HALOCARBON 23 by Advanced Specialty Gases of Reno, Nev.), difluoromethane ($CH_2F_2$, sold under the tradename HALOCARBON 32 by Advanced Specialty Gases of Reno, Nev.), hexafluoroethane ($C_2F_6$, sold under the tradename HALOCARBON 116 by Advanced Specialty Gases of Reno, Nev.), pentafluoroethane ($C_2HF_5$, sold under the tradename HALOCARBON 125 by Advanced Specialty Gases of Reno, Nev.), octafluoropropane ($C_3F_8$, sold under the tradename HALOCARBON 218 by Advanced Specialty Gases of Reno, Nev.), and octafluorocyclobutane ($C_4F_8$, sold under the tradename HALOCARBON C318 by Advanced Specialty Gases of Reno, Nev.).

Although the inventors recognized that solid, liquid and gaseous compounds each may be used to generate hydrogen fluoride or other reactive fluoride species within a subterranean formation and thereby etch a surface comprising a siliceous material therein, it is believed that non-HF fluoride compounds that are gases at standard temperature and pressure may present particular advantages. Specifically, it is believed that gaseous non-HF fluoride compounds may be particularly advantageous in the embodiments described herein, since they may be readily compressed into a liquefied state for introduction into a subterranean formation. Once in the subterranean formation, the liquefied non-HF fluoride compounds may expand to a gaseous state, which may desirably increase the pressure within the subterranean formation, possibly leading to improved production of siliceous material dissolution products and/or fracturing of the subterranean formation. Other advantages may also be realized through use of a gaseous non-HF fluoride compound, as discussed further hereinbelow. Although liquid non-HF fluoride compounds may be used in a somewhat similar manner to gaseous non-HF fluoride compounds, they may not usually lead to the same degree of pressure increase within a subterranean formation unless they are low boiling and easily volatilized. Solid non-HF fluoride compounds may need to be introduced to a subterranean formation in a carrier fluid, the use of which may result in some of the above advantages not being realized.

By using hydrogen fluoride gas or another reactive fluoride species instead of hydrofluoric acid in an acidizing operation, a number of benefits may be realized, particularly when making use of a non-HF fluoride compound that is itself a gas at standard temperature and pressure. Reacting a siliceous material with hydrogen fluoride may produce a fluorinated silicon compound, which can be a gaseous substance in some embodiments. For example, in some embodiments, silicon tetrafluoride, a gaseous compound, may be formed from the siliceous material upon its reaction with hydrogen fluoride. Silicon tetrafluoride, in turn, may further react with excess hydrogen fluoride to form fluorinated silicon anions (e.g., $SiF_5^-$ or $SiF_6^{2-}$). Silicon tetrafluoride and anions formed therefrom may not be formed to a significant degree when reacting a siliceous material with hydrofluoric acid, since silicon tetrafluoride readily reacts with water to produce silicic acid ($SiH_4O_4$). Silicic acid can present significant precipitation issues in a subterranean formation due to its low solubility and gelatinous consistency in aqueous fluids. In addition, alkali metal fluorosilicate precipitation may be problematic when aqueous fluids are present. The use of hydrogen fluoride or another reactive fluoride species in the absence of an aqueous carrier fluid can help avoid these difficulties, thereby lessening the likelihood of formation damage taking place.

Since a gaseous reaction product (i.e., silicon tetrafluoride) may be formed in a subterranean formation in some embodiments described herein, the additional gas pressure supplied by the reaction product may provide further stimulation effects. Moreover, in some instances, a gaseous co-product may form from the non-HF fluoride compound in addition to hydrogen fluoride, where the gaseous co-product may serve as an energizing gas that may further stimulate the subterranean formation. The formation of a gaseous co-product may allow cleanup operations, for example, to be conducted without introducing another gas or additional treatment fluid to the subterranean formation.

As alluded to above, a non-HF fluoride compound, either in a gaseous or liquefied state, may be introduced to a subterranean formation without using a carrier fluid, particularly an aqueous carrier fluid. That is, in some embodiments, a non-HF fluoride compound or the combination of a non-HF fluoride compound and a diluent gas may be directly introduced (i.e., neat) to a subterranean formation in order to practice certain embodiments of the present disclosure, after pressurizing the non-HF fluoride compound to a suitable introduction pressure. Directly introducing a non-HF fluoride compound to a subterranean formation in the absence of an aqueous carrier fluid may allow at least some of the advantages noted above to be realized, including providing the non-HF fluoride compound in a low-viscosity form for ready penetration into a low permeability subterranean formation, such as in a shale formation. However, if fractures are present or if the permeability is higher, a higher viscosity fluid may be more desirable. By compressing a gaseous non-HF fluoride compound into a liquefied state and introducing the liquefied non-HF fluoride compound into a subterranean formation, the gas state may reform therein and thereby provide further stimulation effects. Further, by introducing a non-HF fluoride compound to a subterranean formation in the absence of a carrier fluid, the costs associated with sourcing a carrier fluid and then disposing of a spent treatment fluid may be lessened. In addition, by introducing a non-HF fluoride compound to a subterranean formation in the absence of a carrier fluid, the number of treatment stages or pre-treatment stages may be lessened in some cases.

As additional advantages and in contrast to typical acidizing techniques, the methods described herein may take place in the absence of a mineral acid or a conventional organic acid. This feature can beneficially allow stimulation of a subterranean formation to take place in the presence of siliceous materials that are sensitive to these types of acids. For example, by employing the methods described herein, subterranean formations containing clays that are sensitive to hydrochloric acid, particularly at temperatures greater than about 200° F., may undergo stimulation. Further, transformation of the non-HF fluoride compound into a reactive fluoride species may allow a desirably decreased rate of acidizing to be realized relative to neat hydrogen fluoride gas, thereby promoting deeper penetration into the subterranean formation.

As used herein, the term "standard temperature and pressure" refers to a temperature of 273.15 K and a pressure of 1 bar.

As used herein, the term "carbonate material" refers to any substance that comprises a carbonate anion ($CO_3^{2-}$). The carbonate material may comprise a carbonate mineral such as calcite, dolomite, or any combination thereof. In some instances, a carbonate material may be co-present with a siliceous material.

As used herein, the term "siliceous material" refers to a substance having the characteristics of silica, including silicates and/or aluminosilicates. The term "aluminosilicates" refers to compounds containing aluminum, silicon, and oxygen with appropriate counterions.

As used herein, the term "etching" refers to a reduction in volume of a surface as a result of conducting a chemical reaction thereon.

In some embodiments, methods described herein may comprise: providing a treatment fluid comprising a non-HF fluoride compound, the non-HF fluoride compound being a gas at standard temperature and pressure and that is free of boron; introducing the treatment fluid into a subterranean formation; transforming the non-HF fluoride compound into a reactive fluoride species; and etching a surface in the subterranean formation with the reactive fluoride species, the surface comprising a siliceous material.

Suitable non-HF fluoride compounds that are gases at standard temperature and pressure can include those set forth above. Although boron trifluoride ($BF_3$) is a gas at standard temperature and pressure and can be transformed into a reactive fluoride species, its use in a subterranean formation is believed to be undesirable due to the highly corrosive and toxic nature of this gas. Hence, it presents many of the same problems as does neat hydrogen fluoride.

In some embodiments, the reactive fluoride species can further comprise hydrogen fluoride. Other reactive fluoride species are possible, including those formed during etching reactions conducted in the semiconductor industry. In various embodiments, etching a surface in the subterranean formation with the reactive fluoride species can comprise reacting the hydrogen fluoride with the siliceous material to form a fluorinated silicon compound or a reaction product thereof. When aluminosilicates are present, a fluorinated aluminum compound may also be formed. In some embodiments, the fluorinated silicon compound may comprise silicon tetrafluoride or a reaction product thereof. Reaction products of silicon tetrafluoride that may form include, for example, silicic acid and anions such as $SiF_5^-$ and $SiF_6^{2-}$. In some embodiments, the fluorinated silicon compound or its reaction product may lead to the formation of a silica scale in the subterranean formation. Suppression of the formation of a silica scale in the subterranean formation may be addressed through use of a silica scale control additive, a chelating agent, or any combination thereof, as discussed further hereinbelow.

Other non-HF fluoride compounds in addition to those described above may also be used in a like manner in alternative embodiments of the present disclosure, but they may be less desirable for one or more reasons. Chlorofluorocarbons may be used to generate hydrogen fluoride in a like manner to fluorocarbons and hydrofluorocarbons, but these compounds may be undesirable due to environmental regulations. Sulfur hexafluoride is also a gas at standard temperature and pressure and may be decomposed to produce hydrogen fluoride, but it may be less desirable as a hydrogen fluoride source due to its propensity to form hydrogen sulfide, which can lead to corrosion and other safety issues. In addition, it can lead to formation of sulfate and bisulfate ions, which may precipitate in the presence of certain metal ions such as aluminum, calcium, and iron. Likewise, phosphorus trifluoride, phosphorus pentafluoride, and phosphorus oxyfluoride are all gases at standard temperature and pressure and can be decomposed to produce hydrogen fluoride, but they may be problematic as a hydrogen fluoride source, since they may lead to the generation of highly insoluble metal phosphates in a subterranean formation. Xenon tetrafluoride and xenon hexafluoride are highly volatile solids that may be used in related embodiments, but they can be explosive, which can limit their utility.

As discussed above, one of the many advantages of the methods described herein is that decomposing the non-HF fluoride compound to form a reactive fluoride species also may form an energizing gas co-product in the subterranean formation in addition to hydrogen fluoride. For example, carbon dioxide or another carbon-containing gas may be formed from a halocarbon, nitrogen gas may be formed from nitrogen trifluoride, and xenon gas may be formed from xenon difluoride. Regardless of its identity, the energizing gas may pressurize the subterranean formation in an in situ manner, rather than conducting a separate gas pressurization operation as in other stimulation processes. The in situ gas pressurization may promote initial production of a hydrocarbon resource from the subterranean formation. In addition, the in situ gas pressurization may also promote production of the treatment fluid and dissolution products formed therefrom.

In some embodiments, the treatment fluids may further comprise a diluent gas. Suitable diluent gases may include, for example, nitrogen, carbon dioxide, an inert gas (e.g., helium, argon, neon or xenon), natural gas, methane, ethane, propane, butane, isobutane, and any combination thereof. The diluent gas, when used, may be present in the treatment fluid in either a liquefied state or in a gaseous state, as discussed in more detail hereinbelow. When utilizing a diluent gas, the non-HF fluoride compound may be in a gaseous state or in a liquefied state.

Treatment fluids comprising a non-HF fluoride compound may be introduced to a subterranean formation with the non-HF fluoride compound in a liquefied state or in a gaseous state. Particularly when introduced in a liquefied state, the non-HF fluoride compound may expand downhole and further increase the pressure within the subterranean formation. In some embodiments, the treatment fluids may be substantially non-aqueous. In some or other embodiments, the non-HF fluoride compound may be introduced to the subterranean formation without a carrier fluid for the non-HF fluoride compound being present. That is, in some embodiments, the treatment fluid can lack a carrier fluid for the non-HF fluoride compound, particularly an aqueous carrier fluid. A carrier fluid, if present, is considered to be a substance that is a liquid at standard temperature and pressure. Accordingly, a diluent gas, if present, is not considered to comprise a carrier fluid.

In some embodiments, the treatment fluid may consist essentially of the non-HF fluoride compound. In other embodiments, the treatment fluid may consist essentially of the non-HF fluoride compound and a diluent gas.

In some embodiments, the treatment fluids used in the methods described herein may be introduced into the subterranean formation with the non-HF fluoride compound in a liquefied state. In some embodiments, the methods described herein may further comprise compressing the treatment fluid prior to its introduction to the subterranean formation in order to convert the non-HF fluoride compound into a liquefied state. Suitable pressures for liquefying the non-HF fluoride compound will depend on the physical properties of the non-HF fluoride compound and will be understood by one having ordinary skill in the art. Suitable pressures may also be determined to some degree by the properties of the subterranean formation and whether fracturing is desired, for example.

In some embodiments, the treatment fluids may further comprise a diluent gas in a liquefied state that is admixed with the non-HF fluoride compound. In various embodiments, the diluent gas may be selected from those described above. In various embodiments, a ratio of the non-HF fluoride compound to the diluent gas may range between about 1:99 to about 99:1, or 1:75 to about 75:1, or 1:50 to about 50:1, or 1:25 to about 25:1.

In some embodiments, the methods may further comprise converting the non-HF fluoride compound into a gaseous state in the subterranean formation, such that the non-HF fluoride compound undergoes a volume expansion or the subterranean formation is pressurized. In various embodiments, converting the non-HF fluoride compound into a gaseous state may comprise depressurizing the treatment fluid in the subterranean formation, heating the treatment fluid, or any combination thereof. The conditions that result in the conversion of the non-HF fluoride compound into a gaseous state may be conditions that are natively present in the subterranean formation. For example, in some embodiments, the temperature of the subterranean formation may be sufficient to gasify the non-HF fluoride compound in the subterranean formation. A diluent gas, if present, may also undergo gasification in concert with the non-HF fluoride compound. Conditions in the subterranean formation may also result in decomposition of the non-HF fluoride compound to produce hydrogen fluoride or another reactive fluoride species, in some embodiments.

In other embodiments of the methods described herein, the treatment fluid may be introduced into the subterranean formation with the non-HF fluoride compound in a gaseous state. Gaseous state introduction may be desirable, for example, if there are concerns that excessive introduction pressures or downhole gasification might unwantedly fracture or otherwise damage the subterranean formation. In some embodiments, the treatment fluids may further comprise a diluent gas in a gaseous state that is admixed with the non-HF fluoride compound. Suitable diluent gases in this regard may include any of those listed above.

In some embodiments, methods described herein may comprise: providing a substantially non-aqueous treatment fluid comprising a non-HF fluoride compound, the non-HF fluoride compound being a gas at standard temperature and pressure and that is free of boron; introducing the treatment fluid into a subterranean formation containing a siliceous material, the treatment fluid being introduced into the subterranean formation with the non-HF fluoride compound in a liquefied state; decomposing the non-HF fluoride compound in the subterranean formation to form a reactive fluoride species comprising hydrogen fluoride; and reacting the hydrogen fluoride with the siliceous material to form a fluorinated silicon compound or a reaction product thereof.

In some embodiments, the reaction products formed by reacting the hydrogen fluoride with the siliceous material may be produced from the subterranean formation in order to increase the formation's permeability. In some embodiments, production of the reaction products may take place by introducing various post-flush fluids, such as brine fluids, to the subterranean formation after the treatment fluid containing the non-HF fluoride compound.

Any suitable technique may be used to transform the non-HF fluoride compound into a reactive fluoride species, which may comprise decomposing the non-HF fluoride compound to form hydrogen fluoride therefrom. Transforming or decomposing the non-HF fluoride compound may involve breaking a covalent bond to a fluorine atom in the non-HF fluoride compound and forming hydrogen fluoride thereafter. In various embodiments, suitable decomposition techniques that may be used to decompose the non-HF fluoride compounds described herein include, for example, hydrolysis, thermolysis, photolysis, radiolysis, acoustic degradation, exposure to a radical source, or any combination thereof. In some embodiments, the temperature within the subterranean formation may promote decomposition of the non-HF fluoride compound. In other embodiments, thermolysis may be conducted by supplying an external heat source in order to further control the decomposition rate. Without being bound by any theory or mechanism, it is believed that the hydrogen source for forming hydrogen fluoride from a non-HF fluoride compound is residual water that may be natively present in the subterranean formation. Alternatively, to promote hydrogen fluoride formation, a small amount of water may be introduced to the formation in the treatment fluid with the non-HF fluoride compound or separately from the non-HF fluoride compound. Other fluoride species that may be reactive with siliceous materials may also be formed from the non-HF fluoride compounds described herein, particularly in the substantial absence of water. Such etching operations can be similar to those conducted in the semiconductor industry in which no water is present.

Suitable photolysis techniques may include, for example, flash photolysis, pulsed irradiation techniques, continuous irradiation techniques, and any combination thereof. In some embodiments, ultraviolet light may be used to accomplish photolytic decomposition of the non-HF fluoride compound.

Acoustic degradation techniques may include, for example, ultrasound and like methodology.

Suitable radical sources may include, for example, peroxides and azo compounds. Both organic and inorganic peroxides may be used for this purpose.

Transformation or decomposition of the non-HF fluoride compound to form hydrogen fluoride or another reactive fluoride species may occur before the treatment fluid is introduced into the subterranean formation, while the treatment fluid is being introduced into the subterranean formation, after the treatment fluid is introduced into the subterranean formation, or any combination thereof. Transformation or decomposition may take place by instigating a suitable transformation or decomposition condition in the subterranean formation, or the transformation or decomposition condition may be natively present in the subterranean formation. Transformation or decomposition conditions that may be natively present in the subterranean formation include, for example, temperatures that promote or accelerate the transformation or decomposition of the non-HF fluoride compound. In some embodiments, instigating a decomposition condition in the subterranean formation may comprise introducing a degradant, such as a radical source, to the subterranean formation. In some or other embodiments, instigating a decomposition condition in the subterranean formation may comprise introducing a tool or other device to the subterranean formation that provides the decomposition condition. For example, a tool that provides ultraviolet radiation exposure or ultrasound waves may be introduced into a subterranean formation and promote transformation or decomposition of a non-HF fluoride compound therein.

The siliceous material being reacted with the hydrogen fluoride in the subterranean formation is not believed to be particularly limited in location or form. In some embodiments, the siliceous material may comprise the formation matrix. Specifically, in some embodiments, the siliceous material may comprise a silicate or an aluminosilicate such as, for example, silica, quartz, sandstone, shale, clays, feldspars, and the like. In more specific embodiments, the subterranean formation may comprise a sandstone formation and/or a shale formation in which the formation matrix is being etched by the hydrogen fluoride. In some or other embodiments, the siliceous material may comprise a silica scale that is present as precipitation or accumulation damage within a subterranean formation. In some or other embodiments, the siliceous material may be present within a proppant pack in the subterranean formation.

In some embodiments, the treatment fluids described herein may be used to treat a proppant pack or a gravel pack in a subterranean formation in order to increase its permeability. In some embodiments, the treatment fluids may be used to treat a fracture in a subterranean formation in order to increase its permeability. In some embodiments, the treatment fluids described herein may be used in the course of creating or extending a fracture in a subterranean formation by introducing the treatment fluid at or above the fracture gradient of the subterranean formation. That is, in some embodiments, the treatment fluid may be introduced into the subterranean formation such that a fracture gradient pressure of the subterranean formation is exceeded.

In some embodiments, the treatment fluids may be used to remediate a subterranean formation that has precipitation or accumulation damage therein. As used herein, the term "precipitation or accumulation damage" refers to a material that has been dissolved in a subterranean formation and deposited elsewhere within the subterranean formation, optionally after undergoing a further reaction. That is, hydrogen fluoride or another reactive fluoride species produced from the treatment fluids described herein may react with the various components of such damage in order to increase the permeability of the subterranean formation, thereby providing the potential for increased production of a hydrocarbon resource. The precipitation or accumulation damage in the subterranean formation may result from any source, which may include another stimulation operation.

In still other embodiments, the treatment fluids described herein may be used in conjunction with performing a cleanup operation.

In some embodiments, a silica scale control additive may be used in conjunction with the methods described herein. As used herein, the term "silica scale control additive" will refer to any substance capable of suppressing silica scale build-up by increasing the solubility of dissolved silicon, inhibiting polymer chain propagation of dissolved silicon to produce precipitates, and/or decreasing the size and/or quantity of precipitates formed from dissolved silicon. Use of a silica scale control additive may lessen the likelihood of reprecipitation of damaging silicon species that have been generated from etching of the siliceous material. The silica scale control additive may be introduced to the subterranean formation before the non-HF fluoride compound, after the non-HF fluoride compound, or with the non-HF fluoride compound. In some embodiments, the silica scale control additive may be included in the treatment fluid in which the non-HF fluoride compound is present, particularly when the non-HF fluoride compound is in a liquefied state, and in other embodiments, the silica scale control additive may be present in a different treatment fluid. Suitable silica scale control additives may include, for example, phosphonates, aminocarboxylic acids, polyaminocarboxylic acids, polyalkyleneimines (e.g., polyethyleneimine), polyvinylamines, polyallylamines, polyallyldimethylammonium chloride, polyaminoamide dendrimers, any derivative thereof, and any combination thereof. Illustrative commercially available silica scale control additives include, for example, ACUMER 5000 (Rohm and Hass), and CLA-STA® XP and CLA-STA® FS (Halliburton Energy Services, Inc.). Other suitable silica scale control additives may include orthodihydroxybenzene compounds, such as tannic acid, for example, as described in commonly owned United States Patent Application Publication 2012/0145401, which is incorporated herein by reference in its entirety.

In some embodiments, a chelating agent may be used in conjunction with the methods described herein. A chelating agent may be used to sequester aluminum ions that are leached from an aluminosilicate before the aluminum ions react with excessive quantities of fluoride, thereby lessening the quantity of fluoride that is available for promoting silicon dissolution. The chelating agent may be introduced to the subterranean formation before the non-HF fluoride compound, after the non-HF fluoride compound, or with the non-HF fluoride compound. In some embodiments, the chelating agent may be included in the treatment fluid in which the non-HF fluoride compound is present, particularly when the non-HF fluoride compound is in a liquefied state, and in other embodiments, the chelating agent may be present in a different treatment fluid. Suitable chelating agents are not believed to be particularly limited.

A number of aminopolycarboxylic acids may be suitable for use as the chelating agent in the treatment fluids and methods described herein. A number of these aminopolycarboxylic acid chelating agents may be biodegradable. As used herein, the term "biodegradable" refers to a substance that can be broken down by exposure to environmental conditions including native or non-native microbes, sunlight, air, heat, and the like. Use of the term "biodegradable" does not imply a particular degree of biodegradability, mechanism of biodegradability, or a specified biodegradation half-life. In this regard, suitable aminopolycarboxylic acid chelating agents may include, for example, glutamic acid diacetic acid (GLDA), methylglycine diacetic acid (MGDA), β-alanine diacetic acid (β-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1,2-dicarboxyethoxyl)ethyl]glycine (BCA6), N-bis[2-(1,2-dicarboxyethoxyl)ethyl]aspartic acid (BCA5), N-bis[2-(1,2-dicarboxyethoxyl)ethyl]methylglycine (MCBA5), N-tris[(1,2-dicarboxyethoxy)ethyl]amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, any salt thereof, any derivative thereof, or any combination thereof. Particularly suitable biodegradable chelating agents that may be used in conjunction with the methods described herein include, for example, MGDA, GLDA, EDDS, β-ADA, IDS, TCA6, BCA3, BCA5, BCA6, MCBA3, and MCBA5.

In some embodiments, as an alternative to aminopolycarboxylic acid chelating agents, traditional chelating agents such as, for example, ethylenediaminetetraacetic acid (EDTA), propylenediaminetetraacetic acid (PDTA), nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediaminedi(o-hydroxyphenylacetic) acid (EDDHA), glucoheptonic acid, gluconic acid, citric acid, any salt thereof, any derivative thereof, or the like may be used in conjunction with the methods described herein.

In some or other alternative embodiments, suitable chelating agents can include hydroxamates, as described in commonly owned U.S. patent application Ser. No. 13/663,825, filed on Oct. 30, 2012 and incorporated herein by reference in its entirety. In some or other alternative embodiments, suitable chelating agents can include pyridinecarboxylic acids, as described in commonly owned U.S. patent application Ser. No. 13/837,090, filed on Apr. 3, 2013 and incorporated herein by reference in its entirety.

In further embodiments, various other constituents may also be present in the treatment fluids described herein or be used in conjunction with the present methods. Such additional constituents may include, for example, surfactants, gel stabilizers, anti-oxidants, polymer degradation prevention additives, relative permeability modifiers, scale inhibitors, corrosion inhibitors, defoaming agents, antifoaming agents, chelating agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, breakers, friction reducers, bridging agents, viscosifiers, weighting agents, solubilizers, pH control agents (e.g., buffers), hydrate inhibitors, consolidating agents, bactericides, catalysts, clay stabilizers, breakers, delayed release breakers, and the like. Combinations of these additives can be used as well. Given the benefit of the present disclosure, one having ordinary skill in the art will be able to determine when to use these additional constituents in a given application.

In various embodiments, systems configured for delivering the treatment fluids of the present disclosure to a downhole location are described herein. In various embodiments, the systems can comprise a pump fluidly coupled to a tubular, the tubular containing a non-aqueous treatment fluid comprising a non-HF fluoride compound, the non-HF fluoride compound being a gas at standard temperature and pressure and that is free of boron, the non-HF fluoride compound being present in the tubular in a liquefied state. Generally, the pump is suitable for pressurizing the non-HF fluoride compound into a liquefied state.

The pump may be a high pressure pump in some embodiments. As used herein, the term "high pressure pump" will refer to a pump that is capable of delivering a treatment fluid downhole at a pressure of about 1000 psi or greater. A high pressure pump may be used when it is desired to introduce the treatment fluid to a subterranean formation at or above a fracture gradient of the subterranean formation, but it may also be used in cases where fracturing is not desired. In some embodiments, the high pressure pump may be capable of fluidly conveying particulate matter, such as proppant particulates, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluid to the high pressure pump. In such embodiments, the low pressure pump may "step up" the pressure of the treatment before it reaches the high pressure pump.

FIG. 1 shows an illustrative schematic of a system that can deliver treatment fluids of the present disclosure to a downhole location, according to one or more embodiments. It should be noted that while FIG. 1 generally depicts a land-based system, it is to be recognized that like systems may be operated in subsea locations as well. As depicted in FIG. 1, system 1 may include tank 10, which contains the non-HF fluoride compound in either a gaseous form or a liquefied form. The treatment fluid may be conveyed via line 12 to wellhead 14, where the treatment fluid enters tubular 16, tubular 16 extending from wellhead 14 into subterranean formation 18. Upon being ejected from tubular 16, the treatment fluid may subsequently penetrate into subterranean formation 18, before or after reverting to a gaseous state. Pump 20 may be configured to raise the pressure of the treatment fluid to a desired degree before its introduction into tubular 16. In some embodiments, pump 20 may result in liquefication of the non-HF fluoride compound. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensors, adapters, joints, gauges, sensors, compressors, pressure controllers, pressure sensors, flow rate controllers, flow rate sensors, temperature sensors, and the like.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

In some embodiments, methods described herein may comprise: providing a treatment fluid comprising a non-HF fluoride compound, the non-HF fluoride compound being a gas at standard temperature and pressure and that is free of boron; introducing the treatment fluid into a subterranean formation; transforming the non-HF fluoride compound into a reactive fluoride species; and etching a surface in the subterranean formation with the reactive fluoride species, the surface comprising a siliceous material.

In some embodiments, methods described herein may comprise: providing a substantially non-aqueous treatment fluid comprising a non-HF fluoride compound, the non-HF fluoride compound being a gas at standard temperature and pressure and that is free of boron; introducing the treatment fluid into a subterranean formation containing a siliceous material, the treatment fluid being introduced into the subterranean formation with the non-HF fluoride compound in a liquefied state; decomposing the non-HF fluoride compound in the subterranean formation to form a reactive fluoride species comprising hydrogen fluoride; and reacting the hydrogen fluoride with the siliceous material to form a fluorinated silicon compound or a reaction product thereof.

In some embodiments, systems described herein may comprise: a pump fluidly coupled to a tubular, the tubular containing a non-aqueous treatment fluid comprising a non-HF fluoride compound, the non-HF fluoride compound being a gas at standard temperature and pressure and that is free of boron, the non-HF fluoride compound being present in the tubular in a liquefied state.

Embodiments disclosed herein include:

A. Methods for treating a subterranean formation. The methods comprise: providing a treatment fluid comprising a non-HF fluoride compound, the non-HF fluoride compound being a gas at standard temperature and pressure and that is free of boron; introducing the treatment fluid into a subterranean formation; transforming the non-HF fluoride compound into a reactive fluoride species; and etching a surface in the subterranean formation with the reactive fluoride species, the surface comprising a siliceous material.

B. Methods for treating a subterranean formation. The methods comprise: providing a substantially non-aqueous treatment fluid comprising a non-HF fluoride compound, the non-HF fluoride compound being a gas at standard temperature and pressure and that is free of boron; introducing the treatment fluid into a subterranean formation containing a siliceous material, the treatment fluid being introduced into the subterranean formation with the non-HF fluoride compound in a liquefied state; decomposing the non-HF fluoride compound in the subterranean formation to form a reactive fluoride species comprising hydrogen fluoride; and reacting the hydrogen fluoride with the siliceous material to form a fluorinated silicon compound or a reaction product thereof.

C. Systems for delivering a non-HF fluoride compound to a subterranean formation. The systems comprise: a pump fluidly coupled to a tubular, the tubular containing a non-aqueous treatment fluid comprising a non-HF fluoride compound, the non-HF fluoride compound being a gas at standard temperature and pressure and that is free of boron, the non-HF fluoride compound being present in the tubular in a liquefied state.

Each of embodiments A, B, and C may have one or more of the following additional elements in any combination:

Element 1: wherein the reactive fluoride species comprises hydrogen fluoride.

Element 2: wherein etching a surface in the subterranean formation comprises reacting hydrogen fluoride with the siliceous material to form a fluorinated silicon compound or a reaction product thereof.

Element 3: wherein the non-HF fluoride compound comprises a gas selected from the group consisting of a halocarbon, xenon difluoride, nitrogen trifluoride, and any combination thereof.

Element 4: wherein the treatment fluid is introduced into the subterranean formation with the non-HF fluoride compound in a liquefied state.

Element 5: wherein the method further comprises converting the non-HF fluoride compound into a gaseous state in the subterranean formation.

Element 6: wherein the treatment fluid further comprises a diluent gas in a liquefied state that is admixed with the non-HF fluoride compound, and the diluent gas comprises a liquefied gas selected from the group consisting of nitrogen, carbon dioxide, an inert gas, natural gas, propane, butane, and any combination thereof.

Element 7: wherein the treatment fluid is introduced into the subterranean formation with the non-HF fluoride compound in a gaseous state.

Element 8: wherein the treatment fluid is substantially non-aqueous.

Element 9: wherein the treatment fluid lacks a carrier fluid for the non-HF fluoride compound.

Element 10: wherein the treatment fluid consists essentially of the non-HF fluoride compound.

Element 11: wherein the treatment fluid consists essentially of the non-HF fluoride compound and a diluent gas.

Element 12: wherein the method further comprises introducing a chelating agent in an aqueous carrier fluid to the subterranean formation.

Element 13: wherein the subterranean formation comprises a formation type selected from the group consisting of a sandstone formation, a shale formation, and any combination thereof.

Element 14: wherein transforming the non-HF fluoride compound into a reactive state comprises a technique selected from the group consisting of hydrolysis, thermolysis, photolysis, radiolysis, acoustic degradation, exposure to a radical source, and any combination thereof.

Element 15: wherein decomposing the non-HF fluoride compound takes place by a technique selected from the group consisting of hydrolysis, thermolysis, photolysis, radiolysis, acoustic degradation, exposure to a radical source, and any combination thereof.

Element 16: wherein the siliceous material is present in a proppant pack in the subterranean formation.

Element 17: wherein the treatment fluid is introduced into the subterranean formation such that a fracture gradient pressure of the subterranean formation is exceeded.

Element 18: wherein decomposing the non-HF fluoride compound also forms an energizing gas in the subterranean formation.

By way of non-limiting example, exemplary combinations applicable to A, B, C include:

The method of A in combination with elements 2 and 3.
The method of A in combination with elements 2, 3, and 4.
The method of A in combination with elements 3 and 14.
The method of B in combination with elements 3 and 15.
The method of B in combination with elements 3 and 6.
The method of A or B in combination with elements 3 and 10.
The method of A or B in combination with elements 3 and 11.
The method of A or B in combination with elements 3, 4 and 5.
The method of A or B in combination with elements 3 and 13.
The method of A or B in combination with elements 3 and 17.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. When "comprising" is used in a claim, it is open-ended. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:
1. A method comprising:
introducing a treatment fluid comprising a non-HF fluoride compound into a subterranean formation, the non-HF fluoride compound being a gas at standard tem- perature and pressure and that is free of boron and is introduced into the subterranean formation in a gaseous state or a liquefied state;

transforming the non-HF fluoride compound into a reactive fluoride species in the subterranean formation, the reactive fluoride species comprising hydrogen fluoride; and etching a surface in the subterranean formation with the hydrogen fluoride, the surface comprising a siliceous material.

2. The method of claim 1, wherein etching a surface in the subterranean formation comprises reacting the hydrogen fluoride with the siliceous material to form a fluorinated silicon compound or a reaction product thereof.

3. The method of claim 1, wherein the non-HF fluoride compound comprises a gas selected from the group consisting of a fluorocarbon, a fluoride hydrocarbon, xenon difluoride, nitrogen trifluoride, and any combination thereof.

4. The method of claim 1, wherein the non-HF fluoride compound is in a liquefied state.

5. The method of claim 4, further comprising:
converting the non-HF fluoride compound into a gaseous state in the subterranean formation.

6. The method of claim 4, wherein the treatment fluid further comprises a diluent gas in a liquefied state that is admixed with the non-HF fluoride compound, the diluent gas comprising a liquefied gas selected from the group consisting of nitrogen, carbon dioxide, an inert gas, natural gas, methane, ethane, propane, butane, isobutane, and any combination thereof.

7. The method of claim 1, wherein the non-HF fluoride compound is in a gaseous state.

8. The method of claim 1, wherein the treatment fluid is substantially non-aqueous.

9. The method of claim 1, further comprising:
introducing a chelating agent in an aqueous carrier fluid to the subterranean formation.

10. The method of claim 1, wherein the subterranean formation comprises a formation type selected from the group consisting of a sandstone formation, a shale formation, and any combination thereof.

11. The method of claim 1, wherein the siliceous material is present in a proppant pack in the subterranean formation.

12. The method of claim 1, wherein the treatment fluid is introduced into the subterranean formation such that a fracture gradient pressure of the subterranean formation is exceeded.

13. A method comprising:
introducing a substantially non-aqueous treatment fluid comprising a non-HF fluoride compound into a subterranean formation containing a siliceous material, the non-HF fluoride compound being a gas at standard temperature and pressure and that is free of boron and is introduced into the subterranean formation in a liquefied state;

decomposing the non-HF fluoride compound in the subterranean formation to form a reactive fluoride species comprising hydrogen fluoride; and reacting the hydrogen fluoride with the siliceous material to form a fluorinated silicon compound or a reaction product thereof.

14. The method of claim 13, wherein the non-HF fluoride compound comprises a gas selected from the group consisting of a fluorocarbon, a fluoride hydrocarbon, xenon difluoride, nitrogen trifluoride, and any combination thereof.

15. The method of claim 13, wherein the treatment fluid further comprises a diluent gas in a liquefied state that is admixed with the non-HF fluoride compound, the diluent gas comprising a liquefied gas selected from the group consisting of nitrogen, carbon dioxide, an inert gas, natural gas, methane, ethane, propane, butane, isobutane, and any combination thereof.

16. The method of claim 13, wherein the treatment fluid lacks a carrier fluid for the non-HF fluoride compound.

17. The method of claim 16, wherein the treatment fluid consists essentially of the non-HF fluoride compound.

18. The method of claim 16, wherein the treatment fluid consists essentially of the non-HF fluoride compound and a diluent gas.

19. The method of claim 13, wherein decomposing the non-HF fluoride compound also forms an energizing gas in the subterranean formation.

* * * * *